United States Patent
Malur Srinivasan et al.

(10) Patent No.: US 11,631,036 B2
(45) Date of Patent: Apr. 18, 2023

(54) BIAS MITIGATION IN MACHINE LEARNING PIPELINE

(71) Applicant: FUJITSU LIMITED, Kawasaki (JP)

(72) Inventors: Ramya Malur Srinivasan, San Diego, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 362 days.

(21) Appl. No.: 16/871,312

(22) Filed: May 11, 2020

(65) Prior Publication Data
US 2021/0350285 A1 Nov. 11, 2021

(51) Int. Cl.
*G06N 20/00* (2019.01)
*G06N 20/20* (2019.01)
*G06F 3/0482* (2013.01)
*G06K 9/62* (2022.01)

(52) U.S. Cl.
CPC .......... *G06N 20/20* (2019.01); *G06F 3/0482* (2013.01); *G06K 9/6256* (2013.01); *G06K 9/6282* (2013.01)

(58) Field of Classification Search
CPC ...... G06N 20/20; G06N 5/003; G06F 3/0482; G06K 9/6256; G06K 9/6282
USPC .......................................................... 706/12
See application file for complete search history.

(56) References Cited

U.S. PATENT DOCUMENTS

| 11,444,893 | B1* | 9/2022 | Kalluri | G10L 13/00 |
| 2013/0346404 | A1* | 12/2013 | Bennett | G06F 16/9535 |
| | | | | 707/732 |
| 2019/0318262 | A1* | 10/2019 | Meinders | G06N 20/00 |
| 2019/0325069 | A1* | 10/2019 | Santos | G06F 16/9538 |

OTHER PUBLICATIONS

European Search Report issued by the EPO in connection with European Patent Application EP 21154954.8 (dated Jul. 21, 2021); 7 pages.
Solon Barocas, et al., "Fairness in Machine Learning: Limitation and Opportunities", Feb. 21, 2020, 181 pp, latest public version available at https://fairmlbook.org.
Joy Buolamwini, et al., "Gender Shades: Intersectional Accuracy Disparities in Commercial Gender Classification", Conference on Fairness, Accountability, and Transparency, 2018, 15 pages Proceedings of Machine Learning Research 81:1-15.

(Continued)

*Primary Examiner* — Neil R McLean
(74) *Attorney, Agent, or Firm* — Fujitsu Patent Center

(57) ABSTRACT

According to an aspect of an embodiment, operations include controlling a user device to display a plurality of task-specific questions onto an electronic user interface (UI) of the user device. Each task-specific question corresponds to a check for presence of a bias in one of a sequence of development phases of a machine learning (ML) model. The operations further include receiving a first input comprising a plurality of user responses corresponding to the displayed plurality of task-specific questions and determining a set of biases associated with the ML model based on the received first input. The operations further include controlling the user device to display the determined set of biases and a set of plausible actions to mitigate an effect of the determined set of biases on the ML model.

20 Claims, 7 Drawing Sheets

(56) References Cited

OTHER PUBLICATIONS

Angel Alexander Cabrera, et al., "FAIRVIS: Visual Analytics for Discovering Intersectional Bias in Machine Learning", Sep. 1, 2019, 11 pages, Georgia Institute for Technology.
Michael Feldman, et al., "Cerlifying and removing disparate impact", Jul. 16, 2015, 28 pp, Research funded in part by NSF Grant 1251049 under the BIGDATA program.
Batya Friedman, et al., "Bias in Computer Systems", ACM Transactions on Information Systems, vol. 14, No. 3, Jul. 1996, pp. 330-347.
Fimnit Gebru, et al., "Datasheets for Datasets", Mar. 19, 2020, arXiv:1803.09010v7 [cs.DB].
Kenneth Holstein, et al., "Improving Fairness in Machine Learning Systems: What Do Industry Practitioners Need?", CHI Conference on Human Factors in Computing Systems Proceedings (CHI 2019), May 4-9, 2019, Glasgow, Scotland UK. ACM, New York,NY, USA, 16 pages, https://doi.org/10.1145/3290605.3300830.
Aditya Khosla, et al., "Undoing the Damage of Dataset Bias", ECCV'12: Proceedings of the 12th European conference on Computer Vision—vol. Part I, Oct. 2012 pp. 158-171, https://doi.org/10.1007/978-3-642-33718-5_12.
Matt Kusner, et al., "Counterfactual Fairness", 31st Conference on Neural Information Processing Systems (NIPS 2017), 18 pages Long Beach, CA, USA.
Ninareh Mehrabi, et al., "A Survey on Bias and Fairness in Machine Learning", Sep. 17, 2019, 31 pages, arXiv:1908.09635v2 [cs.LG].
Razieh Nabi, et al., "Fair Inference on Outcomes", 11 pages, 2018, Association for the Advancement of Artificial Intelligence (www.aaai.org).
Andrea C. Skelly, et al., "Assessing bias: the importance of considering confounding", Volume Evidence-Based Spine-Care Journal 3, Issue 1, 2012, 12 pp.
Harini Suresh, et al., "A Framework for Understanding Unintended Consequences of Machine Learning", Feb. 17, 2020, 10 pages, arXiv:1901.10002v3 [cs.LG].
Nathaniel Swinger, et al., "What are the biases in my word embedding?" 15 pages, AIES '19: Proceedings of the 2019 AAAI/ACM Conference on AI, Ethics, and Society, Jan. 2019 pp. 305-311, https://doi.org/10.1145/3306618.3314270.
Tatiana Tommasi, et al., "A Deeper Look at Dataset Bias", May 2015, 15 pages, https://arxiv.org/abs/1505.01257v1 [cs.CV].
People + AI Research (PAIR), (n.d.) "What If . . . you could inspect a machine learning model, with minimal coding required? " https://pair-code.github.io/what-if-tool/.
IBM Research Trusted AI, (n.d.) "AI Fairness 360 Open Source Toolkit", https://aif360.mybluemix.net/.
Adele Peters, (Jun. 12, 2018) "This tool lets you see-and correct-the bias in an algorithm", https://www.fastcompany.com/40583554/this-tool-lets-you-see-and-correct-the-bias-in-an-algorithm.
Julian Schuessler, (2018) "Causal Graphs Seminar, Summer 2018" bit.ly/2K5uzk8 (http://www.julianschuessler.net/graphs2018.html).
Margaret Mitchell, et al., "Model Cards for Model Reporting" 10 pp., FAT* '19, Jan. 29-31, 2019, Atlanta, GA, USA, Association for Computing Machinery, ACM ISBN 978-1-4503-6125-5/19/01, https://doiorg/10.1145/3287560.3287596.
Michele Merler, et al., "Diversity in Faces", Apr. 8, 2019, 29 pp., arXiv:1901.10436v6 [cs.CV].
Moritz Hardt, et al., "Equality of Opportunity in Supervised Learning", Oct. 7, 2016, 22 pp., arXiv:1610.02413v1 [cs.LG].
Antonio Torralba, et al., "Unbiased look at dataset bias," CVPR 2011, Providence, RI, 2011, pp. 1521-1528, doi: 10.1109/CVPR.2011.5995347.
Anupam Datta, et al., "Proxy Discrimination in Data-Driven Systems", 14 pp., Jul. 25, 2017, arXiv:1707.08120v1 [cs.CY].

\* cited by examiner

Electronic UI 400C

Bias 414

*Sample Selection Bias*
The sample selection bias is the bias that may be introduced by the selection of individuals, groups or data for analysis in such a way that proper randomization is not achieved, thereby ensuring that the sample obtained is not representative of the population intended to be analyzed.

*Measurement Bias*
The measurement bias may refer to any systematic or non-random error that occurs in the collection of data in a study.

...

Plausible Cause 416

Dataset probably does not contain enough samples across all categories of interest and relevance.

Dataset was probably created using inaccurate devices, or using proxies instead of true labels.

...

Plausible Impact 418

Model may perform poorly on young people, women, etc.

Results of the model could be erroneous if the credit scores are not calculated correctly.

...

Plausible Action 420

Collect a diverse dataset, containing ample instances across gender, age, etc.

Proxy labels cannot be used as substitutes (e.g., occupation cannot be used as feature instead of income).

...

Recheck 422

*FIG. 4C*

BIAS MITIGATION IN MACHINE LEARNING PIPELINE

FIELD

The embodiments discussed in the present disclosure are related to mitigation of bias in machine learning pipeline.

BACKGROUND

With advancements in the field of artificial intelligence, numerous machine learning models are being created and used for various applications, especially for sensitive applications like healthcare applications, financial applications, and judiciary applications. For example, in financial applications, machine learning models may be used to determine whether to give credit cards/loans to an individual/company. In the field of healthcare, machine learning models may be used to prescribe a particular drug to a patient. Similarly, in judiciary systems, machine learning models may be used to determine whether to grant bail to an individual.

In many studies, it has been observed that results of machine learning models can be biased. For example, a machine learning model may be biased against sensitive attributes of a person, such as race, gender, or age. In many cases, biases can be introduced by individual developers or organizations who have conscious or unconscious preferences that may go undiscovered until the machine learning models are used. Implementation of such models for general public can result in unfair treatment, which leads to increasing concern about biases embedded in the results of these machine learning models.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include controlling a user device to display a plurality of task-specific questions onto an electronic user interface (UI) of the user device. Each task-specific question of the displayed plurality of task-specific questions may correspond to a check for presence of a bias in one of a sequence of development phases of a machine learning model. The operations may further include receiving, via the electronic UI, a first input that may include a plurality of user responses corresponding to the displayed plurality of task-specific questions. The operations may further include determining a set of biases associated with the sequence of development phases of the machine learning model based on the received first input. The operations may further include controlling the user device to display the determined set of biases and a set of plausible actions to mitigate an effect of the determined set of biases on the machine learning model onto the electronic UI of the user device.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4C is a diagram that illustrates an example electronic user interface (UI) for displaying an analysis of the user responses received via the example electronic UI of FIG. 4B;

Figure 1:
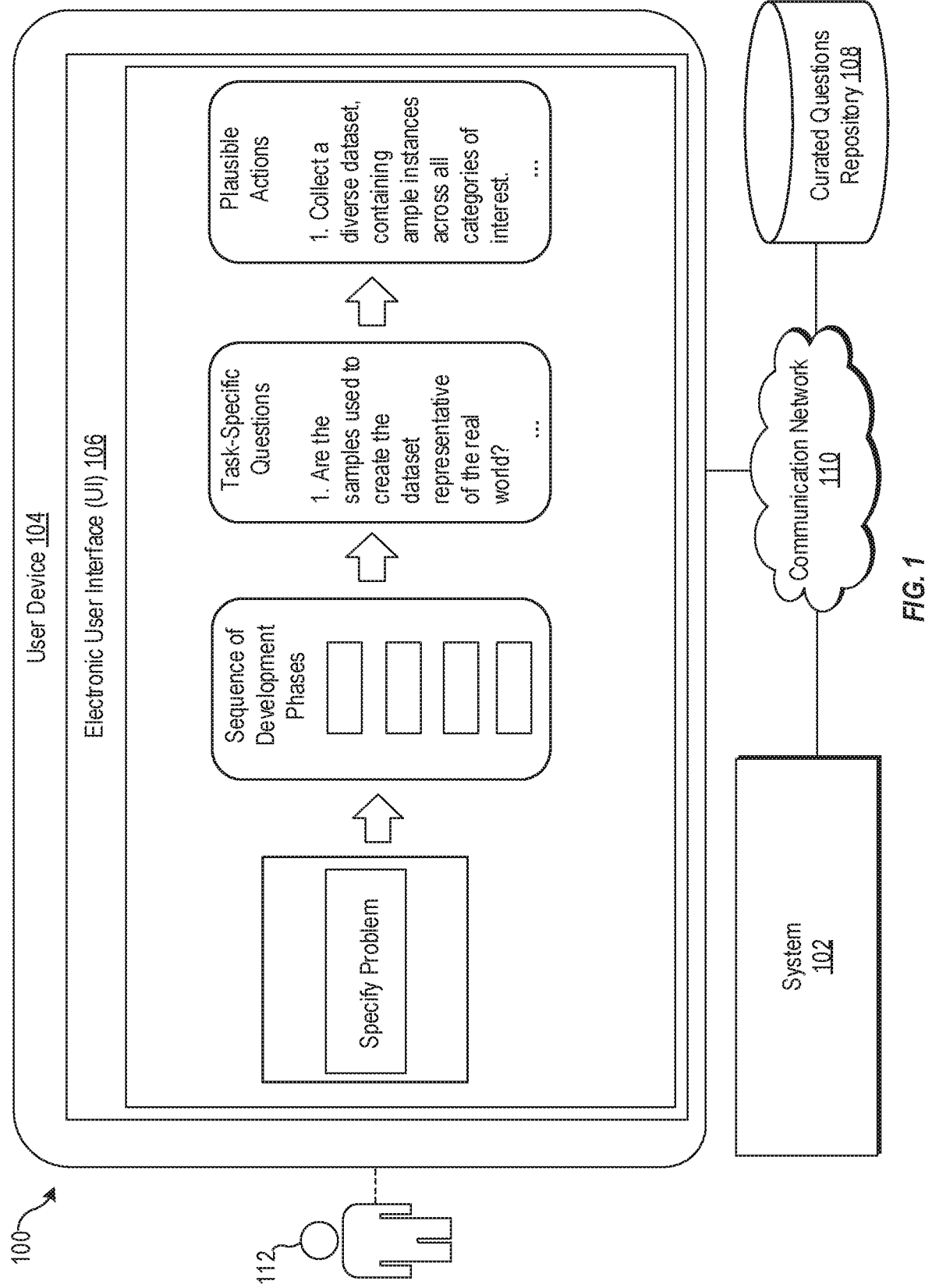
FIG. 1 is a diagram representing an example environment related to mitigation of bias in a machine learning pipeline.

all according to at least one embodiment described in the present disclosure.

DESCRIPTION OF EMBODIMENTS

Some embodiments described in the present disclosure relate to a method and a non-transitory computer-readable medium for mitigation of biases in a machine learning pipeline for development of a machine learning (ML) model. From studies, it has been observed that results of ML models can be biased. In context of machine learning, a bias may be defined as occurrence/instance of a systematic prejudice observed in results of a machine learning model. For example, an ML model may be biased against sensitive attributes of a person, such as race, gender, or age. In many cases, biases can be introduced by individual developers or organizations who have conscious or unconscious preferences that may go undiscovered until the ML models are used. Implementation of such models for general public can result in unfair treatment, which leads to increasing concern about biases embedded in the results of these machine learning models. Therefore, it becomes imperative for a developer or an organization to evaluate their ML models for biases and act towards mitigating the effect of the biases on their ML models.

For example, if a model is to be developed to assess sentencing and parole of convicted criminals to address issue of overcrowded prisons, the dataset of many prisoners may be collected. An ML model may be trained on various features of each prisoner to predict a risk score which may be used to identify prisoners who are less likely to commit a crime if released on parole. Such features may include questions, such as whether one of the prisoner's parents were ever in a prison, or if friends or acquaintances have been in prison, or questions on prisoner gender, prisoner age, prisoner religion, or prisoner race. Some of the features, such as questions on race, religion, or gender may not be appropriate for training the ML model. For instance, if there are more prisoners of certain religion, race, or gender in a prison, the ML model may be more likely to predict a high-risk score for such prisoners.

Conventional methods, such as, What-if Tool® by Google®, IBM® AI fairness 360 tool, Microsoft® research's bias project that learns to un-bias word embeddings, and Accenture® Fairness Tool, rely on a set of algorithms that can detect the bias in the ML model. Almost all of the above tools use algorithms that are focused on computational sources of biases in the ML model. Several other guidelines have also been proposed to address biases in the machine learning pipeline. Some of these guidelines include the use of documentation of released ML models. By reading these documentations, developers can identify the biases in their version of the ML model and can act to mitigate the impact of such biases on the results of the ML model. Other guidelines include use of datasheets for datasets. The datasheets typically provide creation, composition, intended use, maintenance, or other properties of the datasets. Developers may use such datasheets to appropriately use their datasets in a way that no bias is introduced in ML models which may be developed using the datasets. Some other guidelines suggest that future research should focus on supporting practitioners in collecting and curating high-quality datasets. However, the above-mentioned guidelines are only specific to a dataset creation phase in the machine learning pipeline.

In contrast to the conventional methods and guidelines, the disclosed method spans through all the development phases involved in the ML pipeline, i.e. from dataset creation to problem formulation to data analysis and evaluation. Unlike existing algorithms that largely focus on computational sources of biases, the disclosed method spans an exhaustive set of biases that can occur in the ML pipeline. The disclosed method may aid users/developers in identifying biases and in obtaining insights into potential ways to alleviate/mitigate the biases. For example, users may be able to access a digital assistant that may guide different types of users (machine learning developer, consumer) in identifying different sources of biases that can occur in their ML pipeline starting from data collection and preparation to problem formulation, data analysis and evaluation step. Additionally, use-sheets may be displayed to the users to educate them about the types of biases present in their ML pipeline and enlist some application limitations of the ML model (trained), thereby providing guidance in terms of when not to use a learned model given the types of biases.

Embodiments of the present disclosure are explained with reference to the accompanying drawings.

FIG. 1 is a diagram representing an example environment related to mitigation of bias in a machine learning pipeline, arranged in accordance with at least one embodiment described in the present disclosure. With reference to FIG. 1, there is shown an example environment 100. In the example environment 100, there is shown a system 102 and a user device 104. There is further shown an electronic user interface (UI) 106 rendered on the user device 104, a curated questions repository 108, and a communication network 110. The system 102 and the user device 104 may be communicatively coupled to each other, via the communication network 110. There is further shown a user 112 who may be associated with the user device 104. Examples of the user device 104 may include, but are not limited to, a mobile device, a desktop computer, a laptop, a computer workstation, a server, such as a cloud server, or a group of servers.

The system 102 may include suitable logic, circuitry, and interfaces that may be configured to receive a user input that includes an application-specific problem associated with a machine learning (ML) model. The application-specific problem may define an objective/goal for which the ML model may be developed to provide a solution. The ML model may implement one or more machine learning methods, such as, but not limited to, classification methods (for example, logistic regression, decision tree, random forest, gradient-boosted tree, neural network, and Naive Bayes), clustering methods (for example, K-means or Mean-Shift Clustering Algorithm), kernel methods, and heuristic/meta-heuristic methods.

The application-specific problem may be indicative of or implicative of a problem (e.g., a business problem, a research problem, a social problem, and the like) and/or an application area (e.g., finance, healthcare, security, and the like) of the problem. In some instances, the application-specific problem may be indicative of or implicative of a machine learning task (e.g., classification, regression, or clustering) associated with the problem. As an example, for financial applications, the application-specific problem may be a business problem, such as credit card fraud detection or approval/denial of credit card applications. For healthcare applications, the application-specific problem may be a healthcare problem, such as identification of cancerous tumors from mammograms, predicting hospitalization requirement based on health data, or classification of images/volumetric data of organ tumor as benign or malign. Other examples of the application-specific problem may include, but are not limited to, face detection, text-to-speech or speech-to-text conversion, semantic scene segmentation or panoptic segmentation for autonomous driving, or sentiment analysis of social media posts.

In one or more embodiments, the system 102 may retrieve a plurality of task-specific questions from the curated questions repository 108 based on the application-specific problem associated with the machine learning (ML) model. The curated questions repository 108 may contain curated sets (or templates) of task-specific questions for a variety of application-specific problems. Each task-specific question may be associated with a tag which may be used to categorize the respective task-specific question under one of a sequence of development phases (also referred to as an ML pipeline) of the ML model.

In one or more embodiments, the sequence of development phases of the ML model may include a dataset creation phase, a problem formulation phase, a data analysis phase, and an evaluation phase. In the dataset creation phase, the user 112 (such as a developer or an analyst) may be responsible for collection raw data from various sources, data cleaning (which may include data deduplication, data standardization, data normalization, and quality check of cleaned data), data ingestion, data preparation, and data segregation (i.e. diving a prepared dataset into a test set, a training set, and a validation set). In the problem formulation phase, the user 112 may be responsible for defining the problem and a solution that the ML model should provide for the problem. In the data analysis phase, the user 112 may be responsible analyzing the dataset (e.g., the test set and the training set) for selection of a set of input variables for the ML model. In the evaluation phase, the user 112 may be responsible for evaluating results and performance (e.g., in terms of a suitable performance metric or an ablation study of the ML model) of the trained ML model on validation datasets or test datasets. In these or other embodiments, the sequence of development phases may also include a model training phase in which the user 112 may be responsible for selecting a suitable ML algorithm to be implemented by the ML model, training the ML model on a training dataset, and tuning hyperparameters of the ML model.

Each task-specific question of the retrieved plurality of task-specific questions may correspond to a check for presence of a bias in one of the sequence of development phases of the ML model associated with the application-specific problem. For example, the retrieved plurality of task-specific questions may correspond to one or more of: the dataset creation phase, the problem formulation phase, the data analysis phase, and the evaluation phase. Such task-specific questions may be used to identify potential sources of biases in the sequence of development phases.

The system 102 may display the retrieved plurality of task-specific questions onto the electronic UI 106 of the user device 104. For example, the electronic UI 106 may display each of the sequence of development phases as a user-selectable button, which when selected, may display task-specific questions pertaining to the respective development phase in a step-by-step manner. Such questions may be selected from the retrieved plurality of task-specific questions.

The system 102 may receive a first input via the electronic UI 106 displayed on the user device 104. The first input may include a plurality of user responses corresponding to the displayed plurality of task-specific questions. In one or more embodiments, the plurality of uses response may include objective responses, such as yes or no, true or false, applicable or not applicable, selected or unselected, and included or excluded. In some other embodiments, the plurality of uses responses may include subjective answers to some questions of the displayed plurality of task-specific questions. In these or other embodiments, the electronic UI 106 may allow the user 112 to skip questions from among the displayed plurality of task-specific questions. Based on the received first input, the system 102 may determine a set of biases associated with the sequence of development phases of the ML model. Such determination may be based on using a rule-based approach (e.g. if-then rules) or using a sophisticated ensemble learning approach, such as random forest or random subspace. Details associated with the determination of the set of biases are provided, for example, in FIG. 3A and FIG. 3B.

In one or more embodiments, the determined set of biases may include one or more of a sample selection bias, a measurement bias, a label bias, a negative set bias, a framing effect bias, a confounding bias, an omitted variable bias, a proxy variable bias, a design related bias, a sample treatment bias, a confirmation or belief bias, and an algorithmic bias. In context of machine learning and statistics, these types of biases are well known to one ordinarily skilled in the art. Therefore, a description of each type of bias is omitted from the disclosure for the sake of brevity.

The system 102 may control the user device 104 to display the determined set of biases and a set of plausible actions to mitigate an effect of the determined set of biases on the ML model. The set of plausible actions may include suggestions to alleviate or mitigate the effect of the determined set of biases in the ML model. In one or more embodiments, each of such suggestions may include one or more steps to correct or revert past user action(s) associated with the sequence of development phases of the ML model.

The set of plausible actions, when acted upon, may assist the user 112 in mitigating the effect of the determined set of biases on the ML model. By following the set of plausible actions, the user 112 may correct, review, revise some or all of past user actions associated with the sequence of development phases. For example, the user 112 may redefine the application-specific problem, update the dataset (such as the training dataset, the test dataset, and the validation dataset), reselect appropriate variables for the ML model, and re-evaluate the results of the ML model based on the reselected variables and the updated dataset.

After the user 112 acts upon the set of plausible actions, the system 102 may control the user device 104 to again display the plurality of task-specific questions on the electronic UI 106. This may be performed to recheck if the ML model is still affected by one or more of the determined set of biases. The user 112 may be provided with options to respond or to skip certain questions. If the ML model is found to be affected by one or more of the determined set of biases, then the system 102 may again display one or more plausible actions to mitigate the effect of such biases on the ML model.

It should be noted here that the communication between the system 102 and the user device 104 may be performed via the communication network 110. The communication network 110 may include a communication medium through which the system 102 may communicate with the user device 104 and/or different devices (not shown). Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, the curated questions repository 108 may be stored on the system 102.

Figure 2:
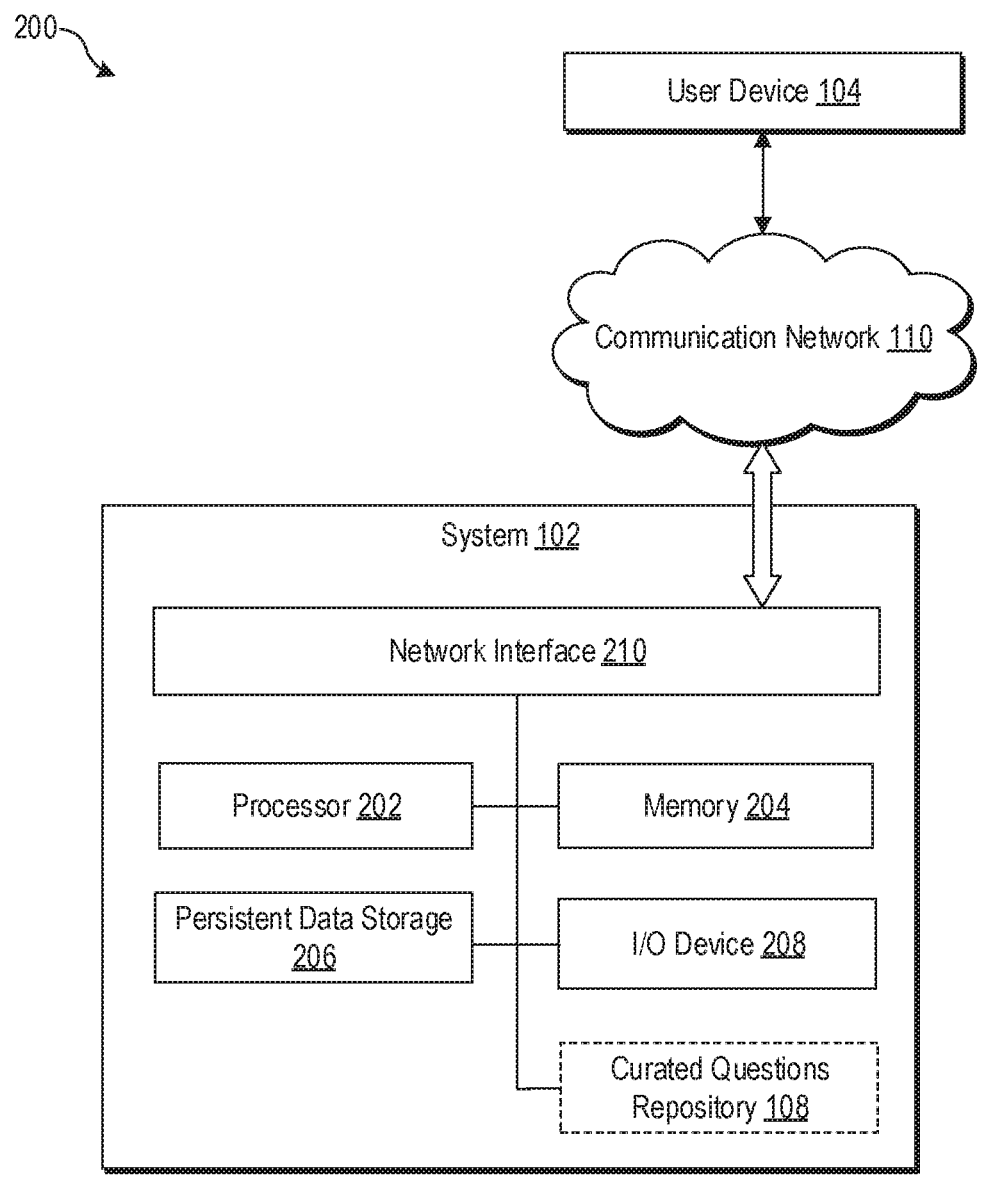
FIG. 2 is a block diagram of a system for mitigation of bias in machine learning model.

FIG. 2 is a block diagram of a system for mitigation of bias in machine learning model, arranged in accordance with at least one embodiment described in the present disclosure. FIG. 2 is explained in conjunction with elements from FIG. 1. With reference to FIG. 2, there is shown a block diagram 200 of the system 102 of FIG. 1. The system 102 may include a processor 202, a memory 204, a persistent data storage 206, an input/output (I/O) device 208, and a network interface 210. Also, the system 102 may include the curated question repository 108.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more different electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, and/or interfaces that may be configured to store program instructions executable by the processor 202. In certain embodiments, the memory 204 may be configured to information associated with various types of biases, plausible actions to mitigate biases determined in the ML model, a plausible cause of each bias, and/or a plausible impact of each bias on results/performance of the ML model. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202, and a description of all the possible types of biases that can exist in the ML model. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive a user input. The I/O device 208 may be further configured to provide an output in response to the user input. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device and a speaker.

The network interface 210 may include suitable logic, circuitry, interfaces, and/or code that may be configured to establish a communication among the system 102, and the user device 104, via the communication network 110. The network interface 210 may be implemented by use of various known technologies to support wired or wireless communication of the system 102, via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

In certain embodiments, the system 102 may be divided into a front-end subsystem and a backend subsystem. The front-end subsystem may be solely configured to receive requests/instructions from the user device 104, one or more of third-party servers, web servers, client machine, and the backend subsystem. These requests may be communicated back to the backend subsystem, which may be configured to act upon these requests. For example, in case the system 102 includes multiple servers, few of the servers may be front-end servers configured to relay the requests/instructions to remaining servers associated with the backend subsystem.

Modifications, additions, or omissions may be made to the system 102, without departing from the scope of the present disclosure. For example, in some embodiments, the system 102 may include any number of other components that may not be explicitly illustrated or described.

Figure 3A:
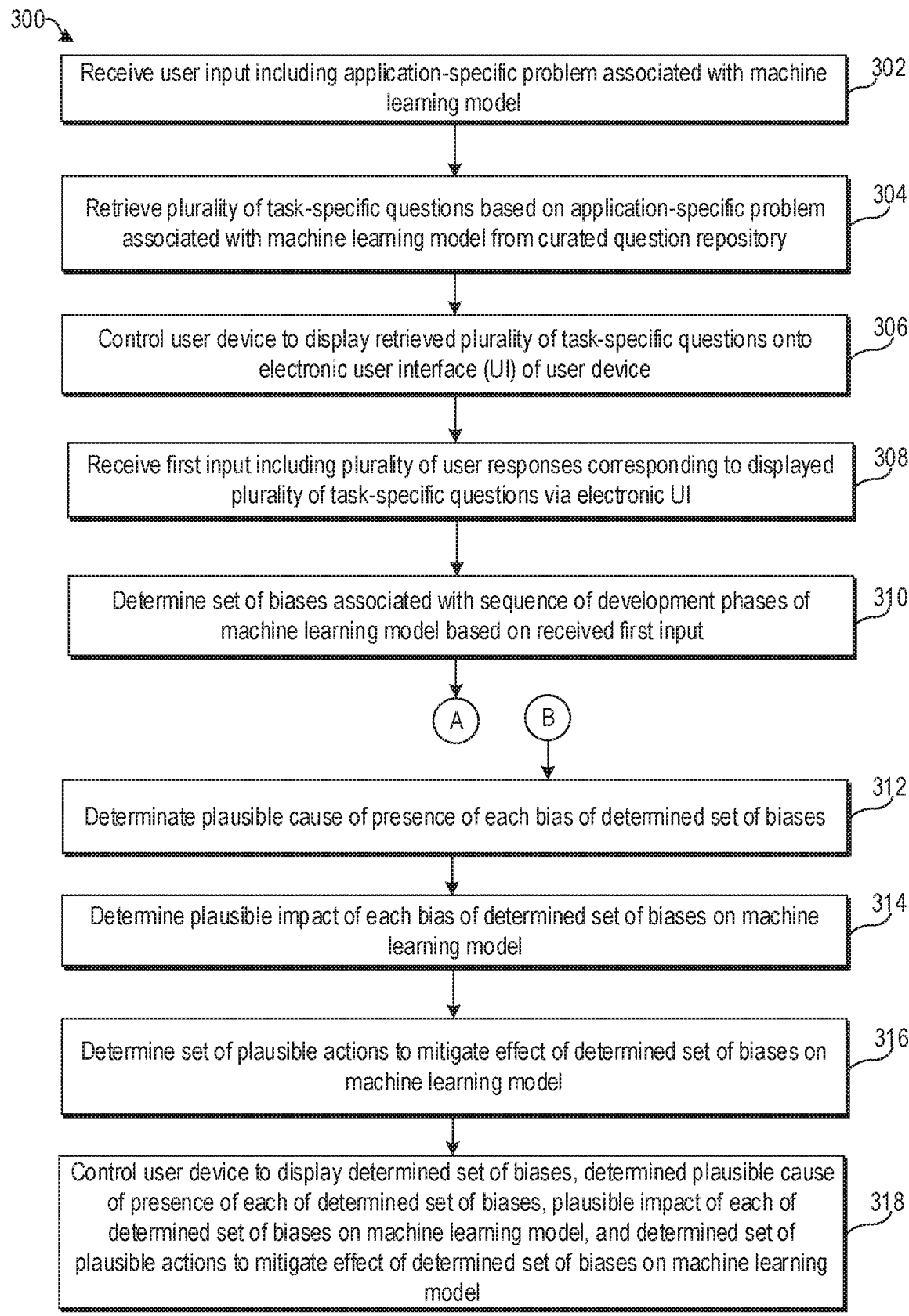
FIGS. 3A and 3B, collectively, illustrate a flowchart of an example method for mitigation of bias in machine learning pipeline.
Figure 3B:
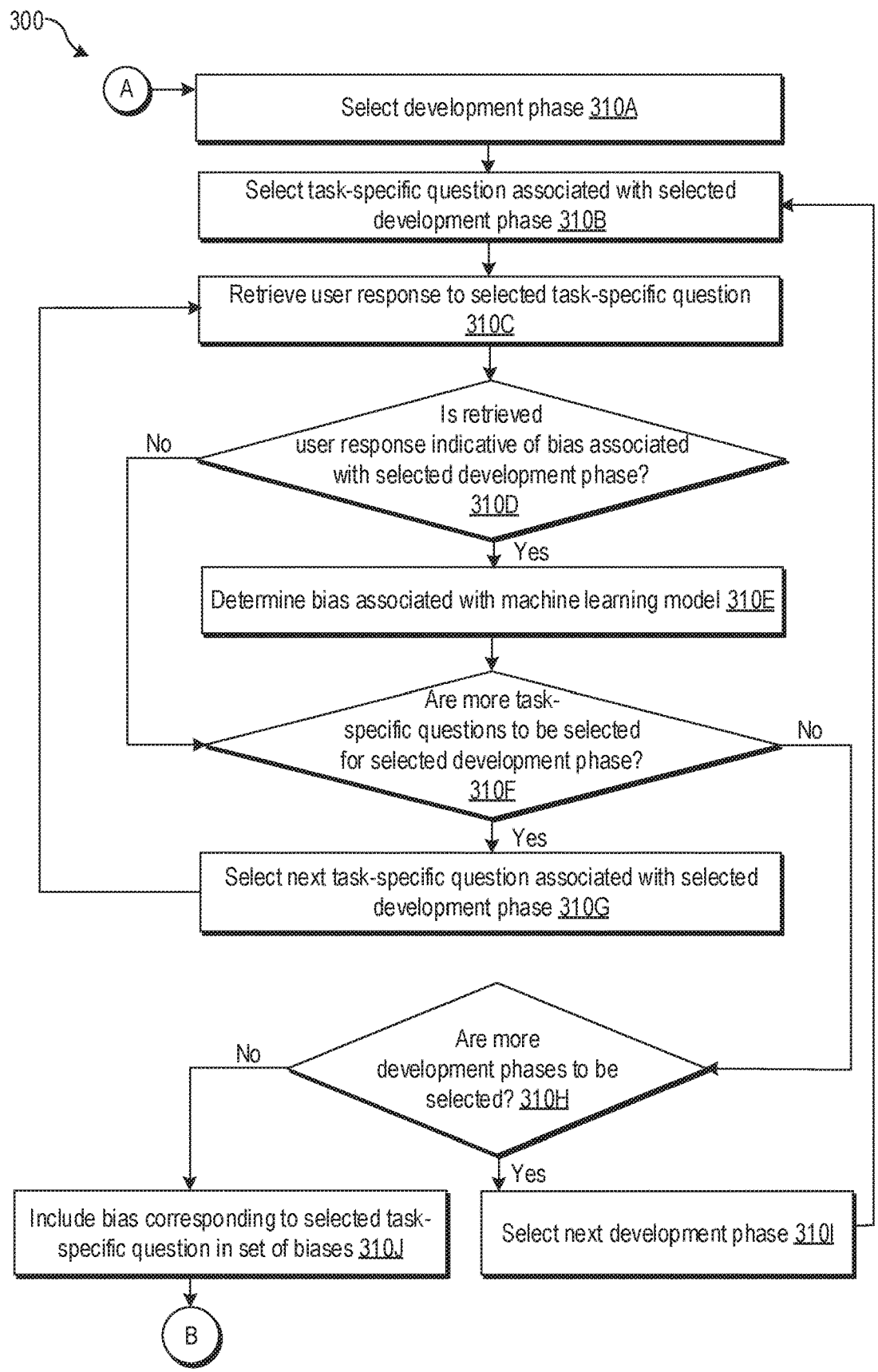

FIGS. 3A and 3B, collectively, illustrate a flowchart of an example method for mitigation of bias in machine learning pipeline, according to at least one embodiment described in the present disclosure. FIGS. 3A and 3B are explained in conjunction with elements from FIG. 1 and FIG. 2. With reference to FIGS. 3A and 3B, there is shown a flowchart 300. The method illustrated in the flowchart 300 may start at 302 and may be performed by any suitable system, apparatus, or device, such as by the system 102 of FIG. 1 or FIG. 2.

At 302, a user input may be received. The user input may include an application-specific problem associated with the ML model. In one or more embodiments, the processor 202 may receive the user input via the electronic UI 106 of the user device 104. An exemplary implementation of the electronic UI 106 for receiving the user input is provided in FIG. 4A, for example.

The application-specific problem may define an objective/goal for which the ML model may be developed to provide a solution. The application-specific problem may be indicative of or implicative of a problem (e.g., a business problem, a research problem, a social problem, and the like). For example, in the field of banking and finance, an application-specific problem may be a business problem on approval of loans for bank customers or detection of fraud in credit card transactions. Similarly, in the field of security, an application-specific problem may be a security problem of detecting trespassers or burglars for home security.

In some instances, the application-specific problem may also include an application area of the problem. Examples of the application area may include, but are not limited to, virtual assistance, medical diagnosis. statistical arbitrage, healthcare, banking and finance, judiciary, self-driving, advertisement/marketing, and security. In some other instances, the application-specific problem may be indicative of or implicative of a machine learning task (e.g., classification, regression, or clustering) associated with the problem. For example, the problem of detection of fraud in credit card transactions may be determined as a machine learning task of clustering and outlier detection.

At 304, a plurality of task-specific questions may be retrieved based on the application-specific problem associated with the ML model. In one or more embodiments, the processor 202 may retrieve the plurality of task-specific questions associated with the application-specific problem from the curated questions repository 108. Each task-specific question of the retrieved plurality of task-specific questions may correspond to a check for presence of a bias in one of the sequence of development phases of the machine learning model. For example, the sequence of development phases of the ML model may include a dataset creation phase, a problem formulation phase, a data analysis phase, and an evaluation phase. Details associated with the sequence of development phases are provided in FIG. 1, for example.

The curated questions repository 108 may store curated sets of task-specific questions for a variety of application-specific problems. In one or more embodiments, the processor 202 may extract keywords associated with the application-specific problem and may retrieve the plurality of task-specific questions by searching the curated questions repository 108 using the extracted keywords. In some instances, each task-specific question may be associated with a tag which may be used to categorize the respective task-specific question under one of the sequence of development phases (also referred to as an ML pipeline) of the ML model. In such a case, the processor 202 may retrieve the plurality of task-specific questions by filtering the curated sets of task-specific questions using tags associated with respective task-specific questions. An example of the retrieved questions for the sequence of development phases is presented in Table 1, as follows:

TABLE 1

| Retrieved questions | | |
|---|---|---|
| Development Phase | | Questions |
| Dataset Creation | 1. | Are the samples used to create the dataset representative of the real world? |
| | 2. | Does the dataset contain ample positive and negative instances? |
| | 3. | Has the dataset been created using consistent tools with minimal measurement errors? |
| | 4. | Has the dataset been created using true values and not proxies? |
| | 5. | Have the annotators been provided with guidelines in labeling the data, especially in the context of ambiguity or multiple relevant labels? |
| Problem Formulation | 1. | Has the problem been defined in a manner so as to not induce bias? |
| | 2. | Is all the contextual information taken into account while defining the problem? |
| | 3. | What is the problem trying to solve? |
| | 4. | For whom is the solution being provided? |
| | 5. | What is the application of the product being developed? |
| Data Analysis | 1. | Is the analysis on a subset of the dataset which can introduce unwanted bias? |
| | 2. | Are there unobserved variables that could introduce bias? |
| | 3. | Are some observed variables omitted in the analysis? And if so, is that introducing any bias? |
| | 4. | Are some non-sensitive variables introducing bias by means of having association with sensitive variables? |
| | 5. | Is the result of the algorithm introducing bias? |
| Evaluation | 1. | Are the evaluators chosen randomly? If not, what is the justification to choosing a set of evaluators? |
| | 2. | How are the subjective biases associated with evaluators (such as their culture, demographics) being addressed in evaluation? |
| | 3. | Are the validation and test datasets representative of real world? |

As another example, a plurality of task-specific questions for a problem of approval or denial of credit card applications is provided in Table 2, as follows:

TABLE 2

| Task-specific questions for the problem of approval or denial of credit card applications | | |
|---|---|---|
| Development Phase | | Task-Specific Questions |
| Dataset Creation | 1. | Does the dataset contain enough samples across genders, age, geographical location, educational background, income and other such relevant demographics of applicants? Has the creditworthiness metric measured accurately? |
| | 2. | Is occupation or gender used as a proxy for income? |

TABLE 2-continued

Task-specific questions for the problem of approval
or denial of credit card applications

| Development Phase | | Task-Specific Questions |
|---|---|---|
| | 3. | Are there enough instances of approvals and denials? |
| Problem Formulation | 1. | How is creditworthiness defined? |
| | 2. | Are the values of stakeholders taken into consideration? |
| | 3. | Is it to maximize company's profits? or to increase loan repayment rate? |
| | 4. | Is it for a company, a regulator or an Applicant? |
| | 5. | Is the application of the ML model creditworthiness or Loan rate calculator? |
| Data Analysis | 1. | Is the algorithm's output unfair such as to a subset such as females? Are the thresholds chosen for determining creditworthiness creating bias? |
| | 2. | Are factors such as family demands affecting both creditworthiness and loan application? |
| | 3. | Are variables such as education omitted in the analysis but would have been useful otherwise? |
| | 4. | Is zip code acting as a proxy for race? |
| | 5. | Is the analysis on a sensitive subset based on age, gender, etc.? |
| Evaluation | 1. | Is the training and test data from the same Population? How does this apply across geographies? |

At 306, the user device 104 may be controlled to display the retrieved plurality of task-specific questions on the electronic UI 106 of the user device 104. In one or more embodiments, the processor 202 may control the user device 104 to display the retrieved plurality of task-specific questions on the electronic UI 106 of the user device 104. By way of example, and not limitation, each of the dataset creation phase, the problem formulation phase, the data analysis phase, and the evaluation phase may be displayed as a user-selectable button, which when selected, may display task-specific questions pertaining to the respective development phase. An exemplary implementation of the electronic UI 106 for displaying task-specific questions is provided in FIG. 4B, for example.

At 308, a first input may be received via the electronic UI 106 of the user device 104. The first input may include a plurality of user responses corresponding to the displayed plurality of task-specific questions. In one or more embodiments, the plurality of user responses may include objective responses, such as a Yes or No, a True or False, Applicable or Not applicable, selected or not selected, and included or excluded. In some other embodiments, the plurality of uses responses may include subjective answers to some of the displayed plurality of task-specific questions. In these or other embodiments, the electronic UI 106 may allow the user 112 to skip questions from among the displayed plurality of task-specific questions.

On the electronic UI 106, a user-selectable option, such as a radio button, a checkbox, or a textbox may be displayed next to each task-specific question. The user 112 may provide the first input by selecting the radio button or the checkbox, or by entering the user response in the textbox. An exemplary implementation of the electronic UI 106 for providing user responses is provided in FIG. 4B, for example.

At 310, a set of biases associated with the sequence of development phases of the ML model may be determined based on the received first input. Such determination may be based on using a rule-based approach (e.g. if-then rules). Exemplary operations for determination of the set of biases using the rule-based approach is described herein from 310A to 310J.

At 310A, a development phase of the sequence of development phases of the ML model may be selected. The selected development phase may be one of: the dataset creation phase, the problem formulation phase, the data analysis phase, or the evaluation phase.

At 310B, a task-specific question of the displayed plurality of task-specific questions may be selected. The selected task-specific question may be associated with the development phase which may be selected at 310A. For example, from Table 1, if the selected development phase is the dataset creation phase, the first question may be selected from Questions 1 to 5.

At 310C, a user response corresponding to the selected task-specific question may be retrieved from the plurality of user responses (at 308). At 310D, it may be determined whether the user response is indicative of a bias associated with the selected development phase of the ML model. For example, a "No" as a user response to the question "Are the samples used to create the dataset representative of the real world?" may be indicative of a bias at the data creation phase. In case the user response is indicative of a bias, control may pass to 310E. Otherwise, control may pass to 310F.

At 310E, the bias associated with the ML model may be determined based on the user response (retrieved at 310C). The determined bias may include one of a sample selection bias, a measurement bias, a label bias, a negative set bias, a framing effect bias, a confounding bias, an omitted variable bias, a proxy variable bias, a design related bias, a sample treatment bias, a confirmation or belief bias, or an algorithmic bias.

Referring to the previous example, the bias may be determined as the sample selection bias based on the user response. The sample selection bias is typically introduced when selection of individuals, groups or data for analysis is not performed with appropriate randomization. This may result in a dataset which may not be a representative of a population intended to be analyzed by the ML model. For example, in a case-control study of smoking and chronic lung disease, association of exposure with disease may tend to be weaker if controls are selected from patients admitted to hospital than if controls are selected from a community of all types of people.

At 310F, it may be determined whether there are more task-questions questions to be selected for the selected development phase. In case there are more task-questions questions for the selected development phase, control may pass to 310G. Otherwise, the control may pass to 310H.

At 310G, a next task-specific question associated with the selected development phase may be selected from the plurality of task-specific questions. Operations from 310C to 310F may repeated for the next task-specific question and all subsequent questions associated with the selected development phase until there are no more questions to be checked for the selected development phase.

At 310H, it may be determined whether there are more development phases to be selected from the sequence of development phases. In case there are more development phases to be selected, control may pass to 310I. Otherwise, the control may pass to 310J.

At 310I, a next development phase may be selected from the sequence of development phases. For example, if initially the data creation phase is selected, then the next development phase may be selected as the problem formulation phase. For the next development phase and subsequent development phases, operations from 310B to 310H may be repeated till until there are no more development phases to be selected from the sequence of development phases.

At 310J, the bias corresponding to the selected task-specific question of the displayed plurality of task-specific questions may be included in the set of biases. An example of the set of biases for some of the task-specific questions of Table 1 is presented in Table 3, as follows:

TABLE 3

Determined set of biases for task-specific questions

| Development Phase | Question # from Table 1 | User Response | Determined Bias |
|---|---|---|---|
| Dataset Creation | Question #1 | No | Sample Selection bias |
| | Question #2 | No | Negative Set bias |
| | Question #3 | No | Measurement bias |
| | Question #4 | No | Label bias |
| | Question #5 | No | Label bias |
| Problem Formulation | Question #1 | No | Framing Effect Bias |
| | Question #2 | No | Method might not generalize well |
| Data Analysis | Question #1 | No | Sample Selection bias |
| | Question #2 | No | Confounded bias |
| | Question #3 | No | Omitted Variable bias |
| | Question #4 | No | Proxy Variable bias |
| | Question #5 | No | Design Related bias |
| Evaluation | Question #1 | No | Sample Treatment bias |
| | Question #2 | No | Confirmation/belief bias |
| | Question #3 | No | Method might not generalize well |

In one or more embodiments, the determination of the set of biases may be performed using a sophisticated ensemble-based learning approach, such as random forest or random subspace. Effectively, using the ensemble-based learning approach, the plurality of user responses may be combined with the plurality of task-specific questions across the sequence of development phases to determine a combination of user responses which causes a most significant impact (in terms of presence of a bias) on the ML model.

For example, a set of decision trees may be constructed based on the retrieved plurality of task-specific questions. Thereafter, based on an ensemble-based learning approach, the constructed set of decision trees may be trained on the plurality of task-specific questions to minimize an impact of incorrect user actions associated with the sequence of development phases of the ML model.

In general, the ensemble-based learning approach combines several models (or decision trees) to provide better predictive performance than a single model. The main principle behind the ensemble-based learning approach is that a group of weak learners can together form a strong learner, thus increasing the accuracy of the models. In this approach, it may be required to set the cost of an incorrect user action. Here cost may be defined in terms of a measurable metric, such as a type 1 error or type 2 error. After the training, the set of biases associated with the sequence of development phases of the ML model may be determined based on the trained set of decision trees and the received first input (at 308).

At 312, a plausible cause of a presence of each bias of the set of biases (determined at 310) may be determined based on the received first input. The plausible cause may correspond to a user action associated with one of the dataset creation phase, the problem formulation phase, the data analysis phase, and the evaluation phase. An example of plausible causes for the presence of the set of biases of Table 3 is presented in Table 4, as follows:

TABLE 4

Plausible causes of bias

| Determined bias | Description of Plausible Cause |
|---|---|
| Sample Selection bias | Dataset probably does not contain enough samples across all categories of interest and relevance. |
| Measurement bias | Dataset was probably created using inaccurate devices, or using proxies instead of true labels |
| Label bias | Labels were probably assigned inconsistently across annotators. |
| Negative set bias | There are not enough positive examples in the dataset. |
| Framing effect bias | The problem formulation/objective inconspicuously induces bias (against some categories of people). |
| Confounding bias | There are probably unobserved variables that are affecting both the input and output which have not been adjusted for. |
| Omitted variable bias | There are probably some variables that have been omitted from analysis. |
| Proxy variable bias | There are some variables used in analysis, which although not deemed sensitive, are having an influence on sensitive variables. |
| Design related bias | The output of the algorithm/model is not fair due to design/architecture. |
| Sample treatment bias | Model evaluations is probably biased due to selected subsets of evaluators, or due to selected subset of populations being shown/given the model results. |
| Confirmation/belief biases | Human evaluation of the algorithm is biased due to subjective prejudices of the evaluators. |

At 314, a plausible impact of each bias of the determined set of biases on the ML model may be determined based on the received first input. In one or more embodiments, the plausible impact may be depicted in terms of an error in results of the ML model, a performance metric of the ML model, inconsistency in the results of the ML model, a group of people/data subjects who may be affected by biased results of the ML model, or an impact on a potential software application which may rely on the biased results of the ML model. Examples of the performance metric may include, but are not limited to, Mean Absolute Error (MAE), Root mean squared error (RMSE), correlation, recall, F1-score, and area under the ROC Curve (ROC AU C)). An example of the plausible impact of each of the determined set of biases of Table 3 is presented below in Table 5, as follows:

TABLE 5

Plausible Impact of bias

| Determined bias | Description of Plausible Impact |
|---|---|
| Sample Selection bias | Model may perform poorly on minority classes (i.e. biased against minority classes) |

TABLE 5-continued

Plausible Impact of bias

| Determined bias | Description of Plausible Impact |
|---|---|
| Measurement bias | Results of the model could be erroneous, i.e. there can be incorrect predictions due to the fact that inappropriate features were used to make the prediction. |
| Label bias | Model may render inconsistent labels, thus reducing or inflating the accuracy. |
| Negative set bias | Model will perform poorly in new scenarios, i.e. model does not generalize well. |
| Framing effect bias | The problem formulation/objective may inconspicuously induce bias (against some categories of people). |
| Confounding bias | Model may not generalize to new situations well, or the model could be biased against minority classes. |
| Omitted variable bias | The model will not capture all the relevant dependencies between the input and output and can lead to underfitting. |
| Proxy variable bias | There can be bias due to the indirect effect of certain non-sensitive variables on the sensitive variables. |
| Design related bias | Model may not generalize well to new scenarios. |
| Sample treatment bias | The evaluation of the model may be inaccurate due to the fact that only a subset of people is evaluating the result, or the model's result itself could be biased because of only a few people getting the benefit of the model. |
| Confirmation/belief biases | There can be inconsistent labels due to subjective preferences and beliefs of evaluators, thereby affecting model accuracy. |

At 316, a set of plausible actions to mitigate an effect of the determined set of biases on the ML model may be determined based on the received first input. The set of plausible actions may include suggestions to alleviate or mitigate the effect of the determined set of biases on the ML model. In one or more embodiments, each of such suggestions may include one or more steps to correct or revert incorrect action(s) of the user 112 associated with the sequence of development phases of the ML model. An example of the set of plausible actions to mitigate the effect of the determined set of biases of Table 3 is presented in Table 6, as follows:

TABLE 6

Set of Plausible actions for the determined set of biases of Table 3

| Determined bias | Description of Plausible Actions |
|---|---|
| Sample Selection bias | Collect a diverse dataset, containing ample instances across all categories of interest. |
| Measurement bias | Try to use instruments with minimum error (e.g. cameras in capturing images), also proxy labels cannot be used as substitutes (e.g., doctor visits cannot be used as feature for disease symptom). |
| Label bias | Create standard guidelines for annotators for labeling ambiguous data, especially when there can be multiple labels for the same data instance. |
| Negative set bias | Create standard guidelines for annotators for labeling ambiguous data, especially when there can be multiple labels for the same data instance. |

TABLE 6-continued

Set of Plausible actions for the determined set of biases of Table 3

| Determined bias | Description of Plausible Actions |
|---|---|
| Framing effect bias | Try to understand the problem's objective, the context surrounding it- for whom is the problem being solved, for what purposes, and within that context, narrow the scope of applicability. |
| Confounding bias | Incorporate domain specific knowledge in model design to understand the effect of unobserved variables. |
| Omitted variable bias | Try to see if all variables of interest have been used in the analysis, estimate the relevance of each variable on the output. |
| Proxy variable bias | Check for what variables are deemed sensitive and what are not, check for indirect effects of non-sensitive variables on the sensitive variables in doing so. |
| Design related bias | Model may not generalize well to new scenarios. |
| Sample treatment bias | Human evaluation should be done in a randomized manner. |
| Confirmation/belief biases | Try to choose evaluators randomly across diverse backgrounds. |

At 318, the user device 104 may be controlled to display, onto the electronic UI 106, the determined set of biases (e.g., as shown in Table 3), first textual content (e.g., as shown in Table 4) which describes the plausible cause of each bias of the determined set of biases, second textual content (e.g., as shown in Table 5) which describes the plausible impact of each bias of the determined set of biases on the ML model, and third textual content (e.g., as shown in Table 6) which describes the determined set of plausible actions to mitigate the effect of the determined set of biases on the ML model.

The set of plausible actions, when acted upon, may assist the user 112 in mitigating the effect of the determined set of biases on the ML model. By following the set of plausible actions, the user 112 may correct, review, revise some or all of past user actions associated with the sequence of development phases. For example, the user 112 may redefine the application-specific problem, update the dataset (such as the training dataset, the test dataset, and the validation dataset), reselect appropriate variables for the ML model, or re-evaluate the results of the ML model based on the reselected variables and the updated dataset. After the user 112 acts upon the set of plausible actions, the user device 104 may be controlled to again display the plurality of task-specific questions on the electronic UI 106. This may be performed to recheck if the ML model is still affected by one or more of the determined set of biases. The user 112 may be provided with options to respond or to skip certain questions. If the ML model is found to be affected by one or more of the determined set of biases, one or more plausible actions may be displayed on the electronic UI 106 to mitigate the effect of such biases on the ML model.

Control may pass to end. Although the flowchart 300 is illustrated as discrete operations, such as 302, 304, 306, 308, 310, 310A, 310B, 310C, 310D, 310E, 310F, 310G, 310H, 310I, 310J, 312, 314, 316, and 318. However, in certain embodiments, such discrete operations may be further divided into additional operations, combined into fewer operations, or eliminated, depending on the particular implementation without detracting from the essence of the disclosed embodiments.

Figure 4A:
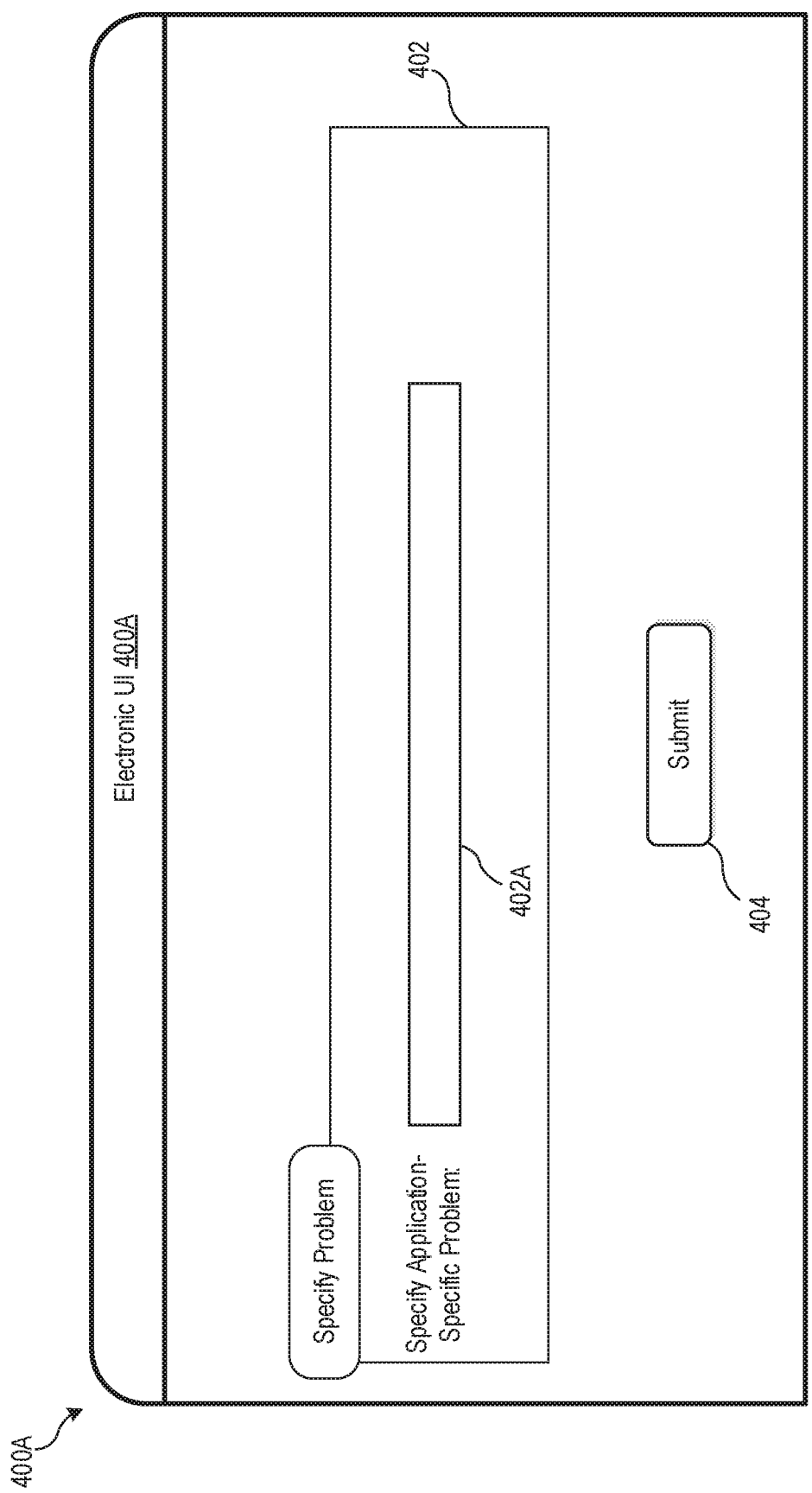
FIG. 4A is a diagram that illustrates an example electronic user interface (UI) for receiving a user input to specify an application-specific problem.

FIG. 4A is a diagram that illustrates an example electronic user interface (UI) for receiving a user input to specify an application-specific problem, according to at least one embodiment described in the present disclosure. FIG. 4A is explained in conjunction with elements from FIG. 1, FIG. 2, FIG. 3A, and FIG. 3B. With reference to FIG. 4A, there is shown an electronic UI 400A, which may be an exemplary implementation of the electronic UI 106 of FIG. 1. The electronic UI 400A may be displayed on the user device 104 based on a user request, which may be received via an application interface displayed onto a display screen of the user device 104. The application interface may be part of an application software, for example, a software development kit (SDK), a cloud server-based application, a web-based application, an OS-based application/application suite, an enterprise application, a mobile application for mitigation of bias in machine learning pipeline.

On the electronic UI 400A, there is shown a set of UI elements, such as a UI element 402 and a UI element 404. The UI element 402 may be labelled as, for example, "Specify Problem" and may include a UI element 402A which may be a textbox. The user 112 may be able to enter the application-specific problem inside the textbox. Through the UI element 402, the application-specific problem may be received from the user 112 as the user input. As shown, for example, the application-specific problem is 'Credit Card Approval'.

In one or more embodiments, the UI element 402A may also include a drop-down menu which may display, upon selection, a curated list of predefined application specific problems. From curated list of predefined application specific problems, the user 112 may be able to select the application-specific problem for which the ML model is/is to be developed. The UI element 404 may be a button and may be labelled as "Submit". The user 112 may click on the button to submit the application-specific problem as the user input to the system 102.

It should be noted that the electronic UI 400A is merely provided as an exemplary implementation of the electronic UI 106 of FIG. 1 and should not be construed as limiting for the scope of the disclosure. The present disclosure may also be applicable to other modifications, deletions, or additions to the electronic UI 400A, without a deviation from the scope of the present disclosure.

Figure 4B:
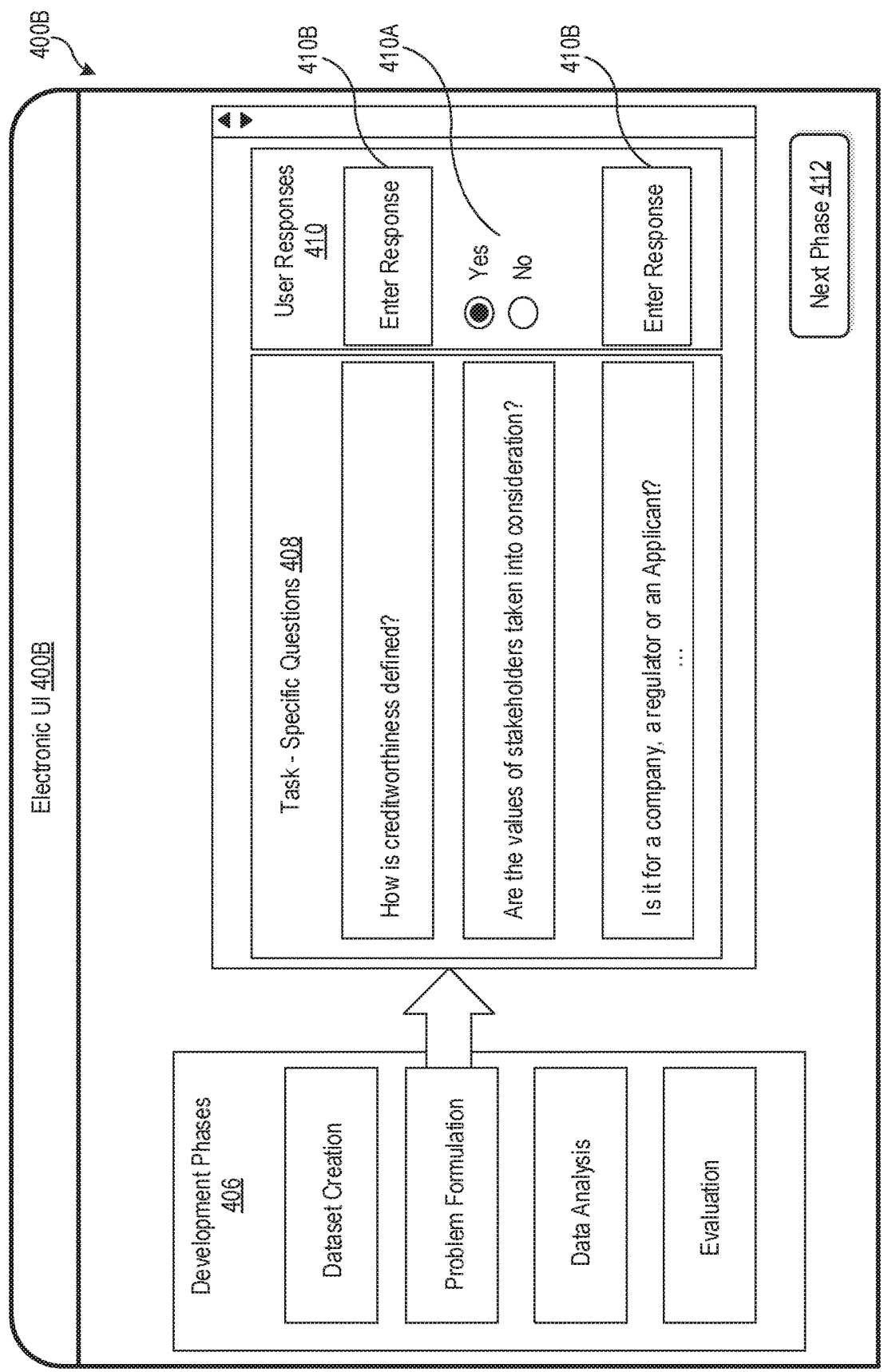
FIG. 4B is a diagram that illustrates an example electronic user interface (UI) for receiving user responses for task-specific questions displayed based on the user input via the example electronic user interface of FIG. 4A.

FIG. 4B is a diagram that illustrates an example electronic user interface (UI) for receiving user responses for task-specific questions displayed based on the user input via the example electronic user interface of FIG. 4A, according to at least one embodiment described in the present disclosure. FIG. 4B is explained in conjunction with elements from FIG. 1, FIG. 2, FIG. 3A, FIG. 3B, and FIG. 4A. With reference to FIG. 4B, there is shown an electronic UI 400B, which may be an exemplary implementation of the electronic UI 106 of FIG. 1.

On the electronic UI 400B, there is shown a set of UI elements, such as a UI element 406, a UI element 408, a UI element 410, and a UI element 412. Through the UI element 406, the UI element 408, the UI element 410, and the UI element 412, the user 112 may be able to view a plurality of task-specific questions corresponding to the sequence of development phases of the ML model and provide a plurality of user responses (i.e. the first input to the system 102) to the corresponding plurality of task-specific questions.

The UI element 406 may be labeled as "Development Phases" and may display the sequence of development phases of the ML model for recommending approval or denial of a credit card application. The development phases of the ML model may include a dataset creation phase, a problem formulation phase, a data analysis phase, and an evaluation phase. A description of each of the sequence of development phases is provided in FIG. 1 and FIG. 3, for example.

The UI element 408 may be labeled as "Task-Specific Questions". Each development phase in the sequence may be rendered as a user-selectable option, which when selected, triggers the UI element 408 to display a subset of the plurality of task-specific questions associated with a development phase which may be selected via the UI element 406.

The displayed subset of task-specific questions may be retrieved from the curated questions repository 108 and may correspond to one of: the dataset creation phase, the problem formulation phase, the data analysis phase, and the evaluation phase of the ML model. An example of the plurality of task-specific questions for the problem of approval/denial of credit card application is provided in Table 7, as follows:

TABLE 7

Task-specific questions for the problem of approval/denial of credit card applications

| Development Phase | | Task-Specific Questions |
|---|---|---|
| Dataset Creation | 1. | Does the dataset contain enough samples across genders, age, geographical location, educational background, income and other such relevant demographics of applicants? Has the creditworthiness metric measured accurately? |
| | 2. | Is occupation or gender used as a proxy for income? |
| | 3. | Are there enough instances of approvals and denials? |
| Problem Formulation | 4. | How is creditworthiness defined? |
| | 5. | Are the values of stakeholders taken into consideration? |
| | 6. | Is it to maximize company's profits or to increase loan repayment rate? |
| | 7. | Is it for a company, a regulator or an Applicant? |
| | 8. | Is the application of the ML model creditworthiness or Loan rate calculator? |
| Data Analysis | 9. | Is the algorithm's output unfair such as to a subset such as females? Are the thresholds chosen for determining creditworthiness creating bias? |
| | 10. | Are factors such as family demands affecting both creditworthiness and loan application? |
| | 11. | Are variables such as education omitted in the analysis but would have been useful otherwise? |
| | 12. | Is zip code acting as a proxy for race? |
| | 13 | Is the analysis on a sensitive subset based on age, gender, etc.? |
| Evaluation | 14 | Is the training and test data from the same Population? How does this apply across geographies? |

The UI element 410 may be labelled as "User Responses" and may include a UI element 410A and/or a UI element 410B for each task-specific question. The UI element 410A may include a set of radio buttons and the UI element 410B may include a textbox. Each of the set of radio buttons may be mapped to a type of user response, such as yes or no, true or false, applicable or not application, and included or excluded. For each task-specific question on the UI element 408, the user 112 may provide the user response by selecting one of the set of radio buttons on the UI element 410A. In some instances, instead of selecting a radio button, the user 112 may enter the user response to the respective task-specific question into the textbox of UI element 410B. For example, for question #5 "Are the values of stakeholders taken into consideration?", the user response may be provided as "Yes" by selecting a radio button mapped to "Yes" on the UI element 410A. As another example, for question 7 "Is it for a company, a regulator or an Applicant?", the user response may be entered as "company" inside the textbox of the UI element 410B.

The UI element 412 may be a button and may be labelled as "Next Phase". By clicking the UI element 412, the system 102 may display another subset of the plurality of task-specific questions corresponding to a next development phase of the ML model. If a user response to each of the plurality of task-specific questions is received, then the user 112 may click on the UI element 412 to display an analysis of the plurality of user responses. Such an analysis may include a set of biases associated with the ML model, plausible causes/sources of the set of biases, and a plausible impact of each of the set of biases on the ML model, and a set of plausible actions to mitigate the effect of the set of biases on the ML model. Details associated the displayed analysis of the plurality of user responses are provided in FIG. 4C, for example.

It should be noted that the electronic UI 400B is merely provided as an exemplary implementation of the electronic UI 106 of FIG. 1 and should not be construed as limiting for the scope of the disclosure. The present disclosure may also be applicable to other modifications, deletions, or additions to the electronic UI 400B, without a deviation from the scope of the present disclosure.

FIG. 4C is a diagram that illustrates an example electronic user interface (UI) for displaying an analysis of the user responses received via the example electronic UI of FIG. 4B, according to at least one embodiment described in the present disclosure. FIG. 4C is explained in conjunction with elements from FIG. 1, FIG. 2, FIG. 3A, FIG. 3B, FIG. 4A, and FIG. 4B. With reference to FIG. 4C, there is shown an electronic UI 400C, which may be an exemplary implementation of the electronic UI 106 of FIG. 1.

On the electronic UI 400C, there is shown a set of UI elements, such as a UI element 414, a UI element 416, a UI element 418, a UI element 420, and a UI element 422. Through the UI element 414, the UI element 416, the UI element 418, the UI element 422, and the UI element 422, the user 112 may be able to view the set of biases associated with the ML model, the plausible causes/sources of the set of biases, and the plausible impact of each of the set of biases on the ML model, and the set of plausible actions to mitigate the effect of the set of biases on the ML model.

The system 102 may control the user device 104 to display, onto the electronic UI 400C, the UI element 414 as a first use-sheet which includes the set of biases and a description of each bias of the set of biases. The set of biases may be determined based on the first input received via the electronic UI 400B of FIG. 4B. The set of biases may include, for example, the sample selection bias, the measurement bias, the label bias, the negative set bias, the framing effect bias, the confounding bias, the proxy variable bias, and the sample treatment bias.

The system 102 may further control the user device 104 to display, onto the electronic UI 400C, the UI element 416 which includes first textual content describing the plausible cause of each bias of the set of biases. An example of the first textual content describing the plausible cause of the presence of each bias is provided in Table 8, as follows:

TABLE 8

Plausible cause of each of the set of biases for the problem of approval/denial of credit card applications

| Determined bias | First Textual Content |
| --- | --- |
| Sample Selection bias | Dataset probably does not contain enough samples across all categories of interest and relevance. |
| Measurement bias | Dataset was probably created using inaccurate devices, or using proxies instead of true labels |
| Label bias | Labels were probably assigned inconsistently across annotators. |
| Negative set bias | There are not enough positive examples in the dataset. |
| Framing effect bias | The problem formulation/objective inconspicuously induces bias (against some categories of people). |
| Confounding bias | There are probably unobserved variables that are affecting both the input and output which have not been adjusted for. |
| Proxy variable bias | There are some variables used in analysis, which although not deemed sensitive, are having an influence on sensitive variables. |
| Sample treatment bias | Model evaluations is probably biased due to selected subsets of evaluators, or due to selected subset of populations being shown/given the model results. |

The system 102 may further control the user device 104 to display, onto the electronic UI 400C, the UI element 418 which includes second textual content describing the plausible impact of each bias of the set of biases on the ML model. For example, the second textual content describing the plausible impact of each of the set of biases on the ML model for the problem of approval/denial of credit card application, is provided in Table 9, as follows:

TABLE 9

Plausible impact of each of the determined set of biases on the ML model

| Determined bias | Second Textual Content |
| --- | --- |
| Sample Selection bias | Model may perform poorly on young people, women, etc. |
| Measurement bias | Results of the model could be erroneous if the credit scores are not calculated correctly. |
| Label bias | Results can be inaccurate due to proxies used as features (such as occupation used as a proxy for income). |
| Negative set bias | Model's accuracy may be adversely affected if the dataset has too few default cases. |
| Framing effect bias | Creditworthiness may be defined subjectively, in the interest of maximizing company's profits, and may be biased against some class of people. |
| Confounding bias | Unobserved variables such as family demands may affect both input and output. |
| Proxy variable bias | Variables like zip code could be indicative of race and could induce bias. |
| Sample treatment bias | Model may not generalize to new scenarios. |

The system 102 may further control the user device 104 to display, onto the electronic UI 400C, the UI element 420 which includes the set of biases and the set of plausible actions to mitigate the effect of the set of biases on the ML model. For example, the third textual content describing the set of plausible actions to mitigate the effect of the set of biases on the ML model (for the problem of approval/denial of credit card application), is provided in Table 10, as follows:

TABLE 10

Plausible actions to mitigate the effect of biases on ML model developed for approval/denial of credit card applications

| Determined bias | Third Textual Content |
| --- | --- |
| Sample Selection bias | Collect a diverse dataset, containing ample instances across gender, age, etc. |
| Measurement bias | Proxy labels cannot be used as substitutes (e.g., occupation cannot be used as feature instead of income). |
| Negative set bias | Collect ample instances across different bands of creditworthiness. |
| Framing effect bias | Try to understand the problem's objective, the context surrounding it- for whom (company, applicant, regulator, etc.) is the problem being solved, for what purposes, and within that context, narrow the scope of applicability. |
| Confounding bias | Incorporate domain specific knowledge in model design to understand the effect of unobserved variables. |
| Proxy variable bias | Check for what variables are deemed sensitive and what are not, check for indirect effects of non-sensitive variables on the sensitive variables in doing so. |

The UI element 422 is labelled as "Recheck". By clicking on the UI element 422, the user 112 may be redirected to the electronic UI 400B where the user 112 may be provided with options to re-evaluate and/or modify the plurality of user responses corresponding to the plurality of task-specific questions. When the user 112 acts upon the set of plausible actions to mitigate the effect of the set of biases on the ML model, the UI element 422 may be helpful for the user 112 to review his past actions/responses.

It should be noted that the electronic UI 400C is merely provided as an exemplary implementation of the electronic UI 106 of FIG. 1 and should not be construed as limiting for the scope of the disclosure. The present disclosure may also be applicable to other modifications, deletions, or additions to the electronic UI 400C, without a deviation from the scope of the present disclosure.

Embodiments described in the present disclosure may be used in many application areas, such as healthcare, judiciary, defense, self-driving, insurance claim settlement, video processing, image processing, audio processing, text processing, IoT applications, database management systems, inventory management, air traffic management, security and surveillance, event processing applications, recommendation systems, virtual assistants, navigation, and weather prediction.

Various embodiments of the disclosure may provide one or more non-transitory computer-readable storage media configured to store instructions that, in response to being executed, cause a system (such as the system 102) to perform operations. The operations may include controlling a user device to display a plurality of task-specific questions onto an electronic user interface (UI) of the user device 104. Each task-specific question of the displayed plurality of task-specific questions may correspond to a check for presence of a bias in one of a sequence of development phases of the machine learning model. The operations may further include receiving a first input that may include a plurality of user responses corresponding to the displayed plurality of task-specific questions via the electronic UI. The operations may further include determining a set of biases associated with the sequence of development phases of the machine learning model based on the received first input. The operation may further include controlling the user device to display the determined set of biases and a set of plausible actions to mitigate an effect of the determined set of biases on the machine learning model onto the electronic UI.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   controlling a user device to display a plurality of task-specific questions onto an electronic user interface (UI) of the user device, each task-specific question of the displayed plurality of task-specific questions corresponds to a check for presence of a bias in one of a sequence of development phases of a machine learning model;
   receiving, via the electronic UI, a first input comprising a plurality of user responses corresponding to the displayed plurality of task-specific questions;
   determining a set of biases associated with the sequence of development phases of the machine learning model based on the received first input;
   determining a plausible cause of a presence of each bias of the determined set of biases based on the received first input; and
   controlling the user device to display, onto the electronic UI, the determined set of biases and a set of plausible actions to mitigate an effect of the determined set of biases on the machine learning model.

2. The method according to claim 1, further comprising:
   receiving a user input comprising an application-specific problem associated with the machine learning model; and
   retrieving, from a curated question repository, the plurality of task-specific questions based on the application-specific problem associated with the machine learning model.

3. The method according to claim 1, wherein the plurality of task-specific questions corresponds to at least one of a dataset creation phase of the sequence of development phases, a problem formulation phase of the sequence of development phases, a data analysis phase of the sequence of development phases, and an evaluation phase of the sequence of development phases.

4. The method according to claim 1, further comprising:
   training a set of decision trees on the plurality of task-specific questions based on an ensemble-based learning approach; and
   determining the set of biases associated with the sequence of development phases of the machine learning model based on the trained set of decision trees and the received first input.

5. The method according to claim 1, wherein the determined set of biases comprises one or more of a sample selection bias, a measurement bias, a label bias, a negative set bias, a framing effect bias, a confounding bias, an omitted variable bias, a proxy variable bias, a design related bias, a sample treatment bias, a confirmation or belief bias, and an algorithmic bias.

6. The method according to claim 1, further comprising controlling the user device to display, onto the electronic UI, a UI element as a first use-sheet comprising the determined set of biases and a description of each bias of the determined set of biases.

7. The method according to claim 1, further comprising controlling the user device to display, onto the electronic UI, a UI element comprising first textual content which describes the determined plausible cause of each bias of the determined set of biases.

8. The method according to claim 7, wherein the plausible cause corresponds to a user action associated with one of a dataset creation phase of the sequence of development phases, a problem formulation phase of the sequence of development phases, a data analysis phase of the sequence of development phases, and an evaluation phase of the sequence of development phases.

9. The method according to claim 1, further comprising:
   determining a plausible impact of each bias of the determined set of biases on the machine learning model based on the received first input; and
   controlling the user device to display, onto the electronic UI, a UI element comprising second textual content which describes the determined plausible impact of each bias of the determined set of biases on the machine learning model.

10. The method according to claim 1, further comprising:
    determining the set of plausible actions to mitigate the effect of the determined set of biases on the machine learning model based on the received first input; and
    controlling the user device to display, onto the electronic UI, a UI element comprising the determined set of biases and the determined set of plausible actions to mitigate the effect of the determined set of biases on the machine learning model.

11. A non-transitory computer-readable storage medium configured to store instructions that, in response to being executed, causes a system to perform operations, the operations comprising:
controlling a user device to display a plurality of task-specific questions onto an electronic user interface (UI) of the user device, each task-specific question of the displayed plurality of task-specific questions corresponds to a check for presence of a bias in one of a sequence of development phases of a machine learning model;
receiving, via the electronic UI, a first input comprising a plurality of user responses corresponding to the displayed plurality of task-specific questions;
determining a set of biases associated with the sequence of development phases of the machine learning model based on the received first input;
determining a plausible cause of a presence of each bias of the determined set of biases based on the received first input; and
controlling the user device to display, onto the electronic UI, the determined set of biases and a set of plausible actions to mitigate an effect of the determined set of biases on the machine learning model.

12. The non-transitory computer-readable storage medium according to claim 11, wherein the operations further comprises:
receiving a user input comprising an application-specific problem associated with the machine learning model; and
retrieving, from a curated question repository, the plurality of task-specific questions based on the application-specific problem associated with the machine learning model.

13. The non-transitory computer-readable storage medium according to claim 11, wherein the operations further comprises:
training a set of decision trees on the plurality of task-specific questions based on an ensemble-based learning approach; and
determining the set of biases associated with the sequence of development phases of the machine learning model based on the trained set of decision trees and the received first input.

14. The non-transitory computer-readable storage medium according to claim 11, wherein the determined set of biases comprises one or more of a sample selection bias, a measurement bias, a label bias, a negative set bias, a framing effect bias, a confounding bias, an omitted variable bias, a proxy variable bias, a design related bias, a sample treatment bias, a confirmation or belief bias, and an algorithmic bias.

15. The non-transitory computer-readable storage medium according to claim 11, wherein the operations further comprises controlling the user device to display, onto the electronic UI, a UI element as a first use-sheet comprising the determined set of biases and a description of each bias of the determined set of biases.

16. The non-transitory computer-readable storage medium according to claim 11, wherein the operations further comprises
controlling the user device to display, onto the electronic UI, a UI element comprising first textual content which describes the determined plausible cause of each bias of the determined set of biases.

17. The non-transitory computer-readable storage medium according to claim 16, wherein the plausible cause corresponds to a user action associated with one of a dataset creation phase of the sequence of development phases, a problem formulation phase of the sequence of development phases, a data analysis phase of the sequence of development phases, and an evaluation phase of the sequence of development phases.

18. The non-transitory computer-readable storage medium according to claim 11, wherein the operations further comprises:
determining a plausible impact of each bias of the determined set of biases on the machine learning model based on the received first input; and
controlling the user device to display, onto the electronic UI, a UI element comprising second textual content which describes the determined plausible impact of each bias of the determined set of biases on the machine learning model.

19. The non-transitory computer-readable storage medium according to claim 11, wherein the operations further comprises:
determining the set of plausible actions to mitigate the effect of the determined set of biases on the machine learning model based on the received first input; and
controlling the user device to display, onto the electronic UI, a UI element comprising the determined set of biases and the determined set of plausible actions to mitigate the effect of the determined set of biases on the machine learning model.

20. A system, comprising:
circuitry configured to:
control a user device to display a plurality of task-specific questions onto an electronic user interface (UI) of the user device, each task-specific question of the displayed plurality of task-specific questions corresponds to a check for presence of a bias in one of a sequence of development phases of a machine learning model;
receive, via the electronic UI, a first input comprising a plurality of user responses corresponding to the displayed plurality of task-specific questions;
determine a set of biases associated with the sequence of development phases of the machine learning model based on the received first input;
determining a plausible cause of a presence of each bias of the determined set of biases based on the received first input; and
control the user device to display, onto the electronic UI, the determined set of biases and a set of plausible actions to mitigate an effect of the determined set of biases on the machine learning model.

* * * * *